(12) United States Patent
Coppin et al.

(10) Patent No.: US 8,971,669 B2
(45) Date of Patent: *Mar. 3, 2015

(54) METHOD AND APPARATUS FOR IMAGE PROCESSING (71) Applicant: Google Inc., Mountain View, CA (US)

(72) Inventors: Benjamin Kenneth Coppin, Colttenham (GB); Mustafa Suleyman, London (GB); Arun Nair, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,434

(22) Filed: Jan. 15, 2014

(65) Prior Publication Data

US 2014/0185959 A1    Jul. 3, 2014

Related U.S. Application Data

(63) Continuation of application No. 13/801,027, filed on Mar. 13, 2013, now Pat. No. 8,644,607.

(30) Foreign Application Priority Data

Nov. 1, 2012   (GB) .................................. 1219650.7

(51) Int. Cl.
*G06K 9/54*      (2006.01)
*G06F 17/30*     (2006.01)
(Continued)

(52) U.S. Cl.
CPC ............ *G06F 17/30262* (2013.01); *G06K 9/00* (2013.01); *G06K 9/46* (2013.01); *G06K 2009/4666* (2013.01)
USPC ........... 382/305; 382/168; 382/169; 382/164; 382/170; 382/173

(58) Field of Classification Search
USPC ......... 382/164, 168, 169, 170, 171, 173, 276, 382/305; 358/453, 466, 448, 403, 404
See application file for complete search history.

(56) References Cited

U.S. PATENT DOCUMENTS 8,421,859 B2    4/2013  Zhang et al.
2006/0064248 A1  3/2006  Saidi et al.
(Continued)

FOREIGN PATENT DOCUMENTS

WO        01/72030       9/2001

OTHER PUBLICATIONS

Haralick, Robert, "Textural Features for Image Classification" IEEE Transactions on Systems, Man and Cybernetics, Nov. 1973.

(Continued)

*Primary Examiner* — Ali Bayat
(74) *Attorney, Agent, or Firm* — Fish & Richardson P.C.

(57) ABSTRACT

A method for processing an image to generate a signature which is characteristic of a pattern within said image. The method comprising receiving an image; overlaying a window at multiple locations on said image to define a plurality of sub-images within said image, with each sub-image each having a plurality of pixels having a luminance level; determining a luminance value for each said sub-image, wherein said luminance value is derived from said luminance levels of said plurality of pixels; and combining said luminance values for each of said sub-images to form said signature. Said combining is such that said signature is independent of the location of each sub-image. A method of creating a database of images using said method of generating signatures is also described.

20 Claims, 11 Drawing Sheets (51) Int. Cl.
*G06K 9/00* (2006.01)
*G06K 9/46* (2006.01)

(56) References Cited

U.S. PATENT DOCUMENTS

2008/0212899 A1* 9/2008 Gokturk et al. ............... 382/305
2009/0324077 A1  12/2009 Wu et al.
2010/0048242 A1* 2/2010 Rhoads et al. ............ 455/556.1
2010/0097457 A1* 4/2010 Zhang et al. ................. 348/119
2010/0166339 A1  7/2010 Gokturk et al.
2011/0034176 A1* 2/2011 Lord et al. .................... 455/450
2012/0243051 A1  9/2012 Le Glaunec et al.

OTHER PUBLICATIONS

TECH-Algorithm.com "Nearest Neighbour Image Scaling", Oct. 6, 2007.
Wang et al "Large-Scale Duplicate Detection for Web Image Search" 2006 IEEE INT conference on Multimedia and Expo, Jan. 7, 2006.

\* cited by examiner

METHOD AND APPARATUS FOR IMAGE PROCESSING

CROSS REFERENCE TO RELATED APPLICATION

The present application is a continuation of U.S. patent Ser. No. 13/801,027 filed Mar. 13, 2013; which itself claims priority to British Patent Application No. GB 1219650.7 filed Nov. 1, 2012. The entirety of the aforementioned references is incorporated herein by reference for all purposes.

TECHNICAL FIELD

This invention relates to image processing, in particular to processing images to assist in image searching and image matching.

BACKGROUND OF THE INVENTION

FIGS. 1a to 1e show a variety of static two-dimensional images, in this case photographs of clothing or home furnishing. Each image contains many elements, including color (black, white, grey, red, orange), an object (e.g. dress, shorts, shirt or rug) and texture (e.g. stripes, spots, checks). In each image, the texture has a large scale relative to the image itself. Thus the texture may be termed macro-scale or coarse grained. Moreover, the texture is not consistent across the entire image. The images of FIGS. 1a to 1e are merely representative of the wide variety of images which fall into this category. By contrast, some images contain just a single texture and that texture is fine-grained, e.g. the grain pattern in a rock. The word pattern may be used interchangeably with texture.

It would be useful to be able to classify and/or search for images based on their texture or pattern. There are various known methods for classifying or searching by texture, namely statistical models, geometrical methods, model-based methods and signal-processing methods.

Statistical Models

Typically, these methods assume that there is just one texture in the entire image. Alternatively they can be applied to parts of images to identify texture in different parts of the image. One example of such a technique is the use of co-occurrence matrices described in Robert Haralick's "Textural Features for Image Classification" published in IEEE Transactions on Systems, Man and Cybernetics in November 1973.

Geometrical Methods

These methods assume that images are made up of atomic textural units which can be identified. This can work well with very regular patterns.

Model-Based Methods

These use mathematical models to build up the components of the texture in an image.

Signal Processing Methods

This involves using methods such as Fourier transforms and wavelets, effectively looking at the frequencies (of changes in color or luminance) contained within the image.

These existing methods for matching texture typically work well with images that contain just a single texture and where the texture is fine-grained. This is useful, for example, for automatically determining the difference between different types of rock from close-up photos. However, these methods do not work well with all images, in particular, with images such as those shown in FIGS. 1a to 1e which have a coarse grain and/or comprise more than one texture within the image. The applicant has thus recognized the need for an improved method and apparatus for processing images to improve image matching and/or searching.

Another method for matching images is described in US2009324077 to Microsoft Corporation entitled "Patch-Based Texture Histogram Coding for Fast Image Similarity Search". As set out in the abstract, this describes techniques for identifying copied images based on an original image. Identifying a copied image is based on creating unique and identifiable features that in turn are used to generate multiple histograms. The histograms are generated by patches of the image, where the patches are created by equally dividing the image. The combined patch histograms are representative of the image.

SUMMARY OF THE INVENTION

According to a first aspect of the invention, there is provided a method for processing an image to generate a signature which is characteristic of a pattern within said image comprising:
  receiving an image;
  overlaying a window at multiple locations on said image to define a plurality of sub-images within said image, with each sub-image each having a plurality of pixels having a luminance level;
  determining a luminance value for each said sub-image, wherein said luminance value is derived from said luminance levels of said plurality of pixels;
  combining said luminance values for each of said sub-images to form said signature;
  wherein said combining is such that said signature is independent of the location of each sub-image.

By creating a signature that is independent of the location of each sub-image, this method is insensitive to location (i.e. it is translation independent). In other words, it will identify patterns wherever they occur in an image. Hence, an image that contains a stripy dress in the center could have a similar signature to an image in which the stripes are around the border of the image.

This invention provides a way of comparing the gross-scale texture or pattern of one image with that of a number of other images. This can be used, for example, to search for similar images based on pattern.

Said luminance value may be determined by determining an average luminance for each of said plurality of pixels; determining whether said average luminance is greater than a threshold value; setting each of said plurality of pixels to a first value if said average luminance is greater than a threshold value; setting each of said plurality of pixels to a second value if said average luminance is lower than a threshold value; and combining said first values and said second values to generate said luminance value for each said sub-image. Said threshold value may be the average luminance of the image.

Said first value may be black or one and said second value may be white or zero. The use of black and white results in a simple sub-image composed of black and white pixels. The black and white pixels may be converted into a luminance value which is a binary number. The binary number may be further converted into an index number. It will be appreciated that the binary and index numbers may be determined in different ways; all that is essential is that the same method is used for all sub-images.

Combining said luminance value may comprise defining a histogram having a plurality of slots with each slot representing a luminance value. The slots may thus be numbered with the index number where one is determined. Each slot in said histogram may be incremented for each sub-image having a luminance value corresponding to said slot. In this way, the combining ensures that the signature is independent of the location of each sub-image because the slot in the histogram which corresponds to the index number is incremented regardless of the location within the image of the sub-image which led to that index number.

The size of the histogram may be determined from the size of each sub-image. As an example, said histogram may have 512 slots and each said sub-image may have 3×3 pixels.

Said signature may be considered to be said histogram. Alternatively, said histogram may be converted to a feature vector to form said signature.

The use of a histogram means that the method falls into the statistical category. However, unlike existing methods, our method works well with macro-scale textures contained in real-world images with multiple patterns and textures.

The window may be overlaid on the image such that at least some of said plurality of images partially overlap at least one other image. In other words, in contrast to US2009/0324077, the image is not divided up into separate sub-images. The overlapping images will reinforce the dominant patterns within the image as a whole and ensure that patterns are not missed that happen not to span a particular window. Another key difference over US2009/0324077 is that a single histogram is calculated for the whole image rather than a histogram being calculated for each sub-image. Furthermore, the present invention calculates a luminance value to determine the pattern whereas in US2009/0324077, textures are calculated based on dominant directions. The use of dominant directions means, for example, that while it may be able to deal fairly well with stripes, the method of US2009/0324077 would not work as well with spots, leopard-skin or other non linear patterns.

In the present invention, the image may be rescaled before overlaying said window. The rescaling ensures a consistent result because all images are rescaled to the same fixed size. Said sub-image within said window may also be rescaled to reduce the number of pixels within said sub-image to said plurality of pixels. Reducing the number of pixels affects the computation of the signature for the overall image. For example, if too many pixels are contained in each sub-image, there will be an unmanageable number of slots in the histogram.

Conversion to grayscale may also be incorporated into said method. The color is not generally relevant to the pattern of the image. It is the luminance of each pixel which is key. For example, said received image or said rescaled image may be converted to grayscale before determining said luminance values. Alternatively, the conversion to grayscale may take place when determining said luminance value for said sub-image.

The method was designed to be incorporated into an image search or image matching system such as that described in our pending patent application GB121518.3 which is here incorporated by reference. Thus, the features set out below are designed to be incorporated in the following aspects.

According to another aspect of the invention, there is provided a method of searching for an image comprising:
  receiving a query image;
  determining said signature for said query image, wherein said signature is generated using the method described above;
  retrieving an image from a database together with its corresponding signature;
  comparing said signature for said query image with said signature for said retrieved image to generate a similarity value for said retrieved image;
  repeating said retrieving and comparing steps to generate similarity values for multiple retrieved images;
  ranking said similarity values; and
  outputting said retrieved images having highest ranks.

According to another aspect of the invention, there is provided a method of creating a database of images comprising:
  defining a plurality of sub-sections within said database with each sub-section having a corresponding signature which is generated using the method described above;
  receiving an input image to be input into said database;
  determining a signature for said input image using the method described above;
  comparing said signature for said input image with each signature of said plurality of sub-sections to generate a similarity value for each of said plurality of sub-sections;
  ranking said similarity values; and
  allocating said input image to said sub-section having the highest rank.

The determining of a signature for said query image and/or said input image may be accessing said signature from a database. Alternatively, said signature may be calculated in real-time using the method described above.

In both of the above aspects, the method may be combined with other features such as color and shape. In other words, the method may further comprise inputting a color and/or shape with the query image and generating a similarity value which incorporates said color and/or shape. In other words, the method may further comprise determining the color and/or shape of the input image and the input image may be allocated to a sub-section depending on its color and/or shape.

The invention further provides processor control code to implement the above-described systems and methods, for example on a general purpose computer system or on a digital signal processor (DSP). The code is provided on a physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

The invention further provides systems for carrying out the methods described above. Thus, according to another aspect of the invention, there is provided a system for processing an image to generate a signature which is characteristic of a pattern within said image, said system comprising
  an input to receive an image; and
  a processor configured to:
  overlay a window at multiple locations on said image to define a plurality of sub-images within said image, with each sub-image each having a plurality of pixels having a luminance level;
  determine a luminance value for each said sub-image, wherein said luminance value is derived from said luminance levels of said plurality of pixels;
  combine said luminance values for each of said sub-images to form said signature;
  wherein said combining is such that said signature is independent of the location of each sub-image.

According to another aspect of the invention, there is provided a query engine for searching for an image comprising:
  an input for receiving a query image; and
  a processor configured to
  determine a signature for said query image by overlaying a window at multiple locations on said image to define a plurality of sub-images within said image, with each sub-image each having a plurality of pixels having a luminance level, determining a luminance value for each said sub-image, wherein said luminance value is derived from said luminance levels of said plurality of pixels, and combining said luminance values for each of said sub-images to form said signature; wherein said combining is such that said signature is independent of the location of each sub-image;

retrieve an image from a database together with its corresponding signature;

compare said signature for said query image with said signature for said retrieved image to generate a similarity value for said retrieved image;

repeat said retrieving and comparing steps to generate similarity values for multiple retrieved images; and rank said similarity values; and an output for outputting said retrieved images having highest ranks.

According to another aspect of the invention, there is provided a system for characterizing an image within a database of images, the system comprising:

a database having a plurality of sub-sections with each sub-section having a corresponding signature;

an input for receiving an input image to be input into said database;

a processor which is configured to determine a signature for said input image by overlaying a window at multiple locations on said image to define a plurality of sub-images within said image, with each sub-image each having a plurality of pixels having a luminance level;

determining a luminance value for each said sub-image, wherein said luminance value is derived from said luminance levels of said plurality of pixels; and combining said luminance values for each of said sub-images to form said signature; wherein said combining is such that said signature is independent of the location of each sub-image;

compare said signature for said input image with each signature of said plurality of sub-sections to generate a similarity value for each of said plurality of sub-sections;

rank said similarity values; and allocate said input image to said sub-section having the highest rank.

In each of the systems described above, the signature of the query image or input image may be created using the methods described in detail above.

BRIEF DESCRIPTION OF THE DRAWINGS

FIG. 2b is a flowchart setting out the steps associated with defining a histogram as part of the method of FIG. 2a;

FIG. 3b illustrates a rescaled version of the image of FIG. 3a;

DETAILED DESCRIPTION OF THE DRAWINGS

Figure 1A:
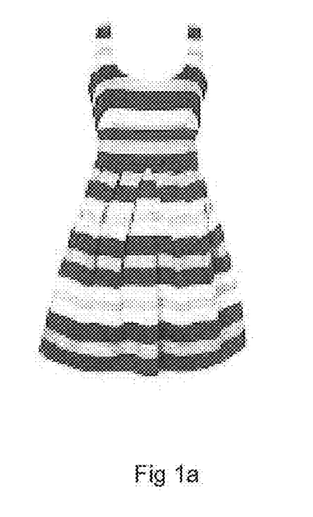
FIGS. 1a to 1e show various images having a coarse grained texture.
Figure 1B:
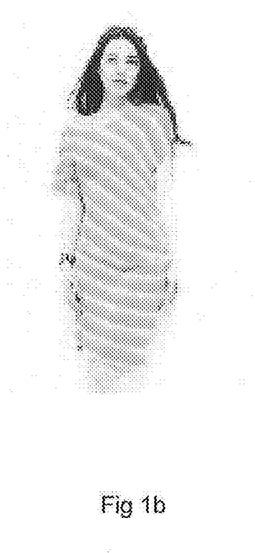
Figure 1C:
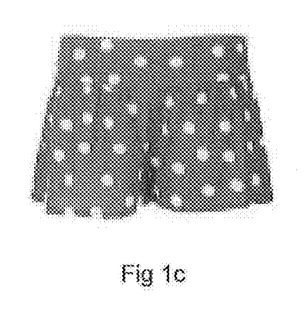
Figure 1D:
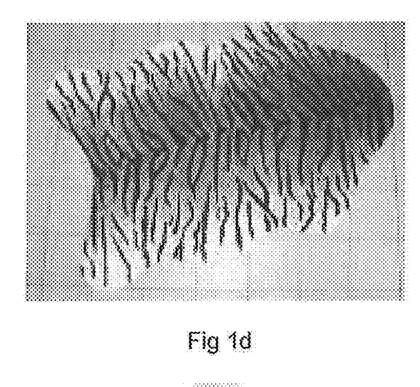
Figure 1E:
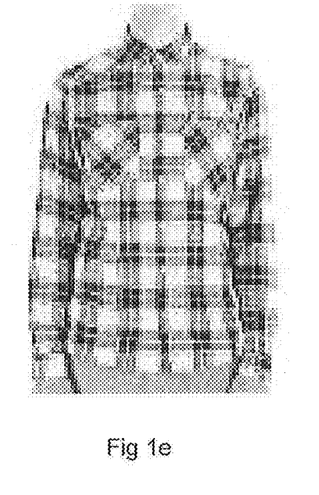
Figure 2A:
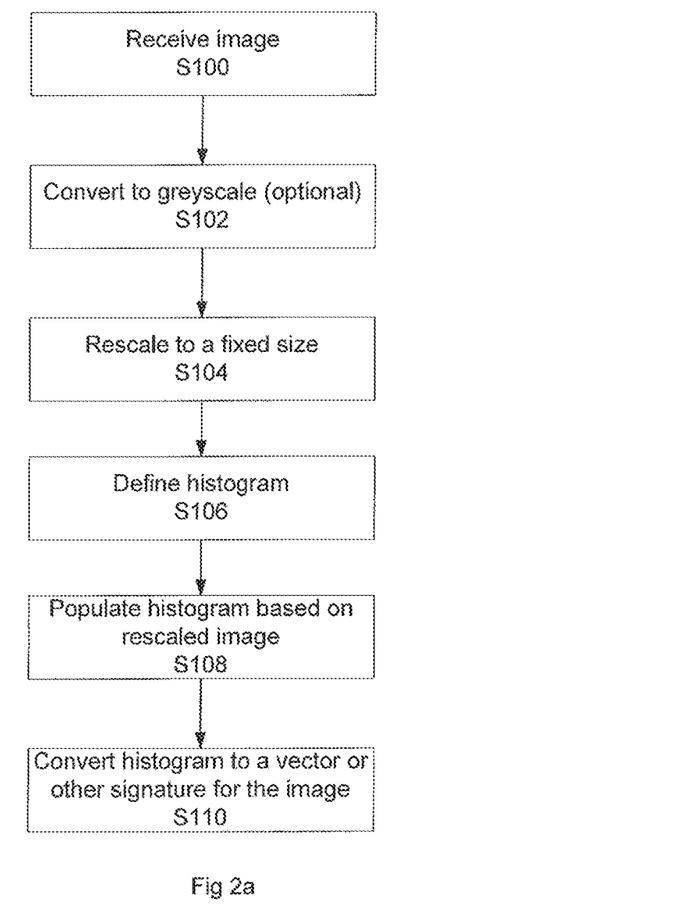
FIG. 2a is a flowchart setting out the method for processing an image according to the present invention.
Figure 2B:
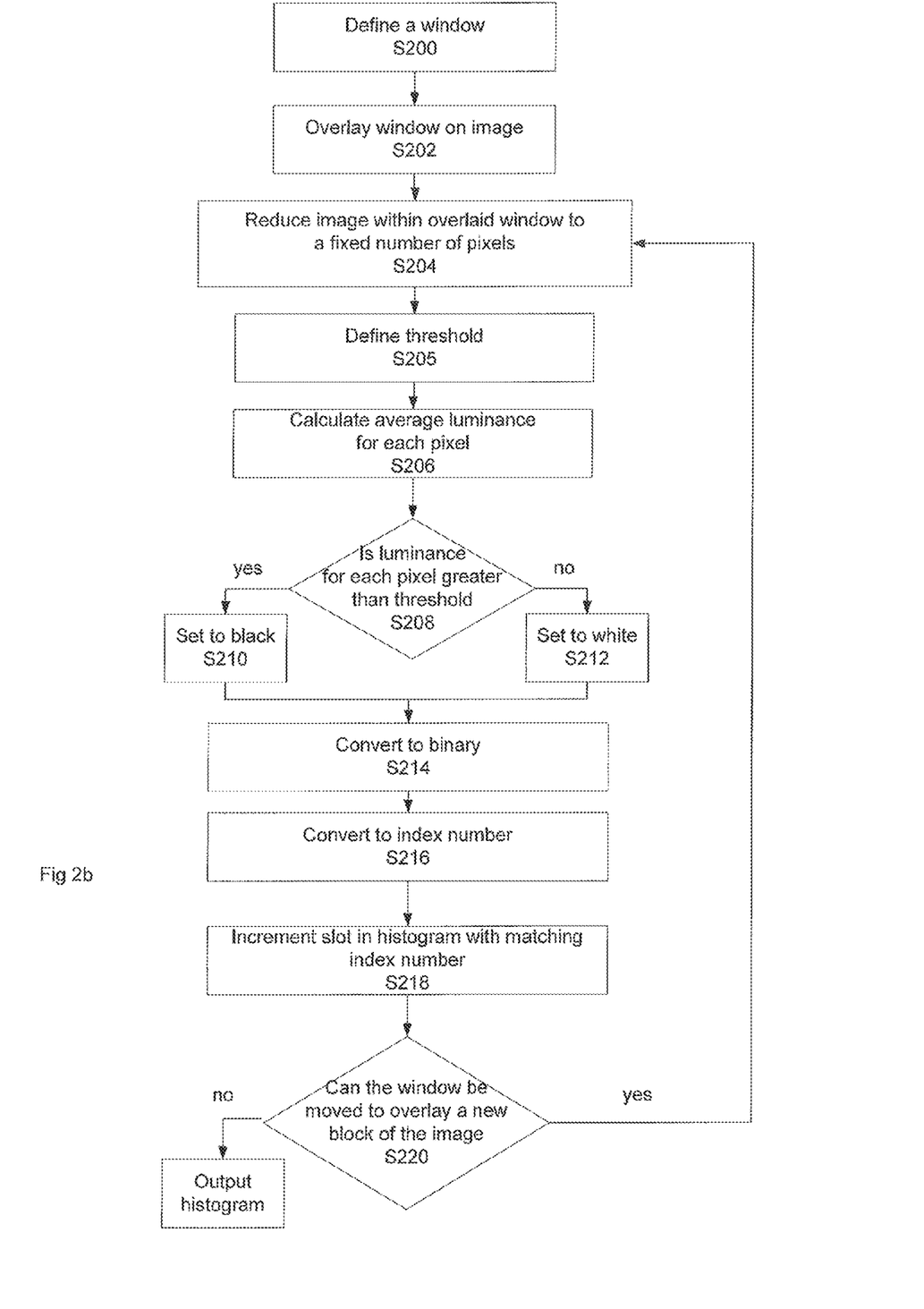

FIGS. 2a and 2b illustrate the steps in the processing of an image according to the present invention. The overall result is that the pattern/texture feature of the image is effectively "extracted" from the image. The first step (S100) is that the image is received.

At step S102, the image is converted to grey-scale (as color is not relevant). This is an optional step. Various techniques for the conversion may be used. One method is to simply convert each RGB color pixel to its luminance value using a linear combination of the gamma-compressed primary intensities for each color. For example, using the ITU-R 601-2 luma transform:

$$L = R*299/1000 + G*587/1000 + B*114/1000$$

where L=luminance; R=red value; G=green value; B=blue value.

Figure 3A:
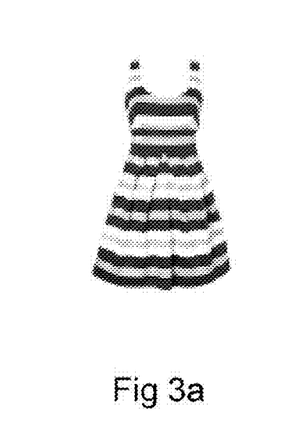
FIG. 3a illustrates an image to be processed according to the present invention.
Figure 3B:
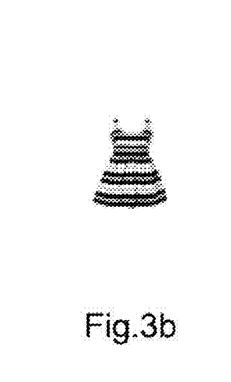

The next step S104 is to rescale the image to a fixed size (say 100×100 pixels). This is also illustrated in FIGS. 3a and 3b. FIG. 3a shows the original image (after optional grayscale conversion) and FIG. 3b shows the rescaled image. The rescaling ensures a consistent result because all images are rescaled to the same fixed size. It also removes some of the fine detail from very large images, which is consistent with a desire to analyze only the coarser grained patterns in the image. Rescaling (or resizing) of images can be done in a number of ways, for example, nearest neighbor, linear interpolation in a 2×2 environment, cubic spline interpolation in a 4×4 environment, or down sampling with anti-aliasing.

For example, the nearest neighbor scaling algorithm may be used. This algorithm calculates the horizontal and vertical ratios between the original image and the scaled image. Once the ratios have been calculated, a buffer is created to store information for the scaled image which is derived from the original image. The technique is described in more detail in "Nearest Neighbor Image Scaling" published in Tech-Algorithm.com on 6 Oct. 2007.

The next step (S106) is to define a histogram with a fixed number of slots. In the example below, an empty histogram is defined with 512 "slots" (the reason for this number is explained below). It is preferable to initialize the histogram before use, e.g. by inserting 0 into each slot. At step S108, the histogram is populated based on the rescaled image, as described in more detail in FIG. 3b. Finally, at step S110, the histogram is converted to a vector of non-negative integer values. The vector has the same number of values as there are slots in the histogram. This vector can be thought of as a signature which is characteristic of the pattern within the image or alternatively the histogram itself may be considered to be the signature. Other techniques may be used for creating the pattern-signature if desired. However, as explained below, the signature is a translation-independent representation of the pattern(s) contained in the image.

Figure 5:
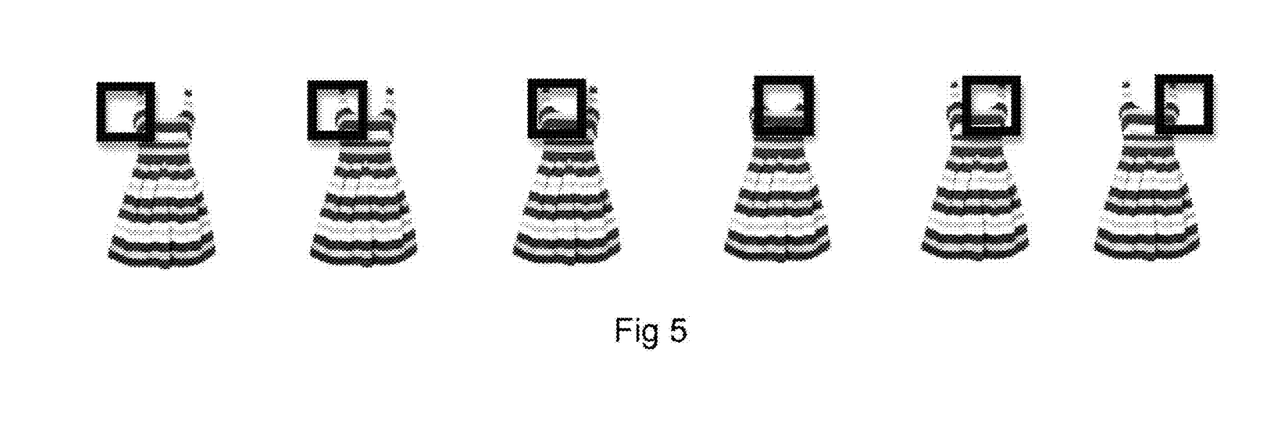
FIG. 5 illustrates the image of FIG. 3b with a window overlaid at various positions.

FIG. 2b explains in more detail the steps in populating the histogram based on the rescaled image. In the initial step S200 a window is defined on the rescaled image. Such a window is shown in FIG. 5 as a square window which is small relative to the image on which it is placed. Thus, for an image rescaled to 100×100 pixels, a window of 12×12 pixels may be used. It will be appreciated that other shapes of window may be used although a square simplifies the calculations.

Figure 3C:
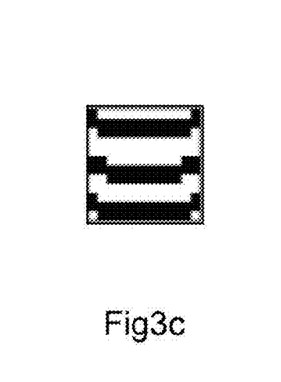
FIG. 3c illustrates a sub-image of image of FIG. 3b.

At step S202, the window is overlaid on the image to create a sub-image of the image. In the present example, the sub-image has 12×12 pixels and is illustrated in FIG. 3c. The 12×12 sub-image is shrunk to 3×3 pixels at step S204. As explained below, a larger fixed number could be used but the efficiency of the algorithm decreases rapidly as this number increases. A threshold is defined at step S205. This threshold value may be the average luminance of the rescaled image and may be calculated using standard techniques. The average luminance value for the 9 pixels is calculated at step S206. This average luminance value is calculated in any standard way.

Figure 3D:
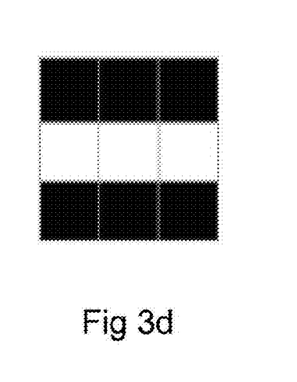
FIG. 3d illustrates a processed version of the sub-image of FIG. 3d.

At step S208, it is determined whether or not the luminance of each pixel is greater than the threshold value. If the luminance value is greater than the threshold value, the pixels are set to black (S210), and all others are set to white (S212). This results in an image containing only pixels which are wholly black or wholly white pixels as illustrated in FIG. 3d.

The thresholding step described above means that the grayscale conversion is not essential. This is possible because the thresholding step could be carried out on the luminance of RGB colored cells. In other words, each RGB value could be converted to a luminance value in order to calculate the average luminance for each pixel at step S206. The thresholding could then be applied at Step S208 to this luminance value.

The fixed number of pixels are flattened into a binary number, by converting black pixels to 1 and white pixels to 0 (step S214). This binary number is converted to an index number (step S216) which corresponds to a slot in the histogram. The histogram slot with the specified index has its value incremented by 1 at step S218. For example, the binary number for the 9 pixel image of FIG. 3d is 111000111 and thus the corresponding index number is 455. It will be appreciated that the binary and index numbers may be determined in different ways; all that is essential is that the same method is used for all images and sub-images. The binary or index number may be considered to be a luminance value which is representative of the luminance levels within the sub-image. It is also noted that the binary and index numbers are location independent. The slot in the histogram which corresponds to the index number is incremented regardless of the location within the image of the sub-image which led to that index number. This is a key feature of the invention.

The next step S220 is to determine whether or not the window can be moved to overlay a new block of the image. As illustrated in FIG. 5, after processing a chunk of the image falling within the window, the window is moved around the image. The window covers every sub-image of a fixed size (say 12×12) in the image. In our experiments, we used a window of 12×12 (i.e. 144 pixels in total) and moved it by one pixel at each step. The window moves across from the top-left to the top-right with each step. Following this, the window would move down by one pixel and would start again from the left-hand size moving to the right. This would be repeated until the entire image had been covered. This movement is illustrated in FIG. 5 with the size of the window and the distance moved by the window exaggerated for clarity. As shown in FIG. 5, both the first and second placements of the window capture the left strap of the dress. Similarly, both the fourth and fifth placements of the window capture the right strap of the dress. Thus, there is overlap between the sub-images captured by the window. Such overlap is a preferred feature of the present invention.

Once the window has been moved to a new location, steps S204 to S220 are repeated for the new location. Thus, the method is an iterative process which gradually covers every sub-image. Once there are no more sub-images to process, the histogram is output.

Figure 4:
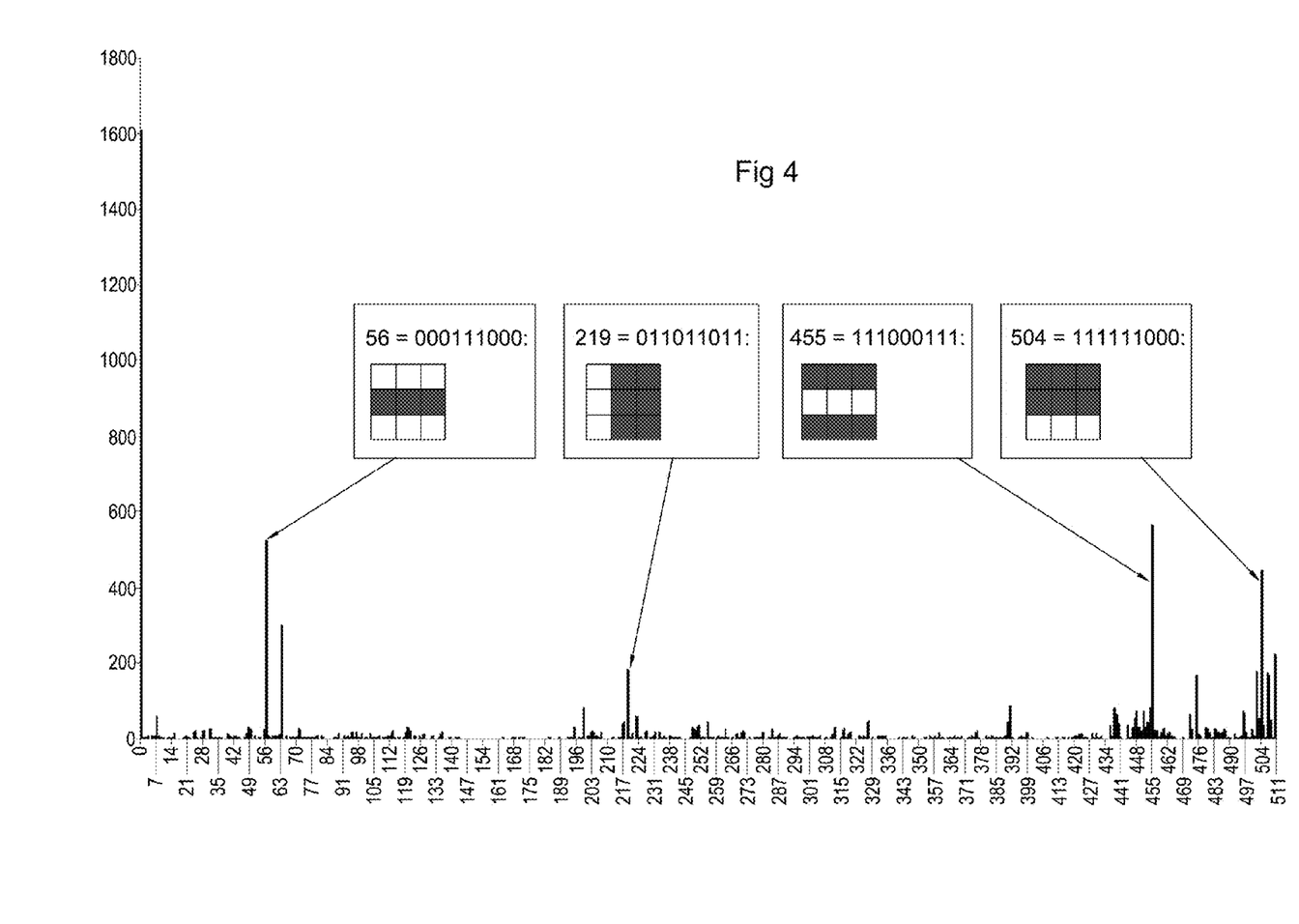
FIG. 4 illustrates a histogram created using the steps of FIG. 2b.

An example of a histogram is shown in FIG. 4. The histogram that is created contains a representation of the types of patterns that are present in the image, in this case for the dress of FIG. 3a. The y-axis shows the count in each slot in the histogram, and the x-axis shows the slot numbers. The dominant patterns are represented by larger values than patterns that occur in only small parts of the image. In this case, the peaks in the histogram are at 0, 56, 455 and 504. The nine pixels sub-images for the four non-zero peaks are shown as inserts. Three of these four dominant patterns represent the horizontal stripes of a certain thickness. Another smaller peak occurs at 219 which represents the edge of each dark horizontal stripe.

0 is the most dominant pattern. This is mostly because of the background being white, which counts as 000000000. This is not necessarily a problem but the method can be improved by applying automatic segmentation to separate the main image from the background and then the method described here applied only to the foreground. This would, in this case, eliminate the vast majority of the values in the 0 slot, although 0 would still probably be a minor peak because of the horizontal white stripes within the main image.

An image with similar patterns will have a similar histogram, whereas an image with very different patterns will have a very different histogram overall.

The numbers used in the descriptions here have been selected as optimal based on experimentation. However, other values can be used. The size of the histogram is entirely dependent on the size that each sub-image is resized to. In this case, the minimum fixed size used is 3×3 pixels. The smallest binary number possible is 000000000 (which in decimal is zero) and the largest possible, with nine bits, is 111111111 which in decimal notation is 511. Hence, the number of slots in the histogram in this example is 512.

In general, the number of slots is defined by:

$$n=2^{d \times d}$$

Where d×d is the number of pixels in the final version of each sub-image (in our case, 3×3=9). Using larger sub-images results in significantly larger histograms. For example, having 4×4 sub-images leads to $2^{16}$=65,536 slots. 5×5→$2^{25}$=over 33 million slots.

Figure 6:
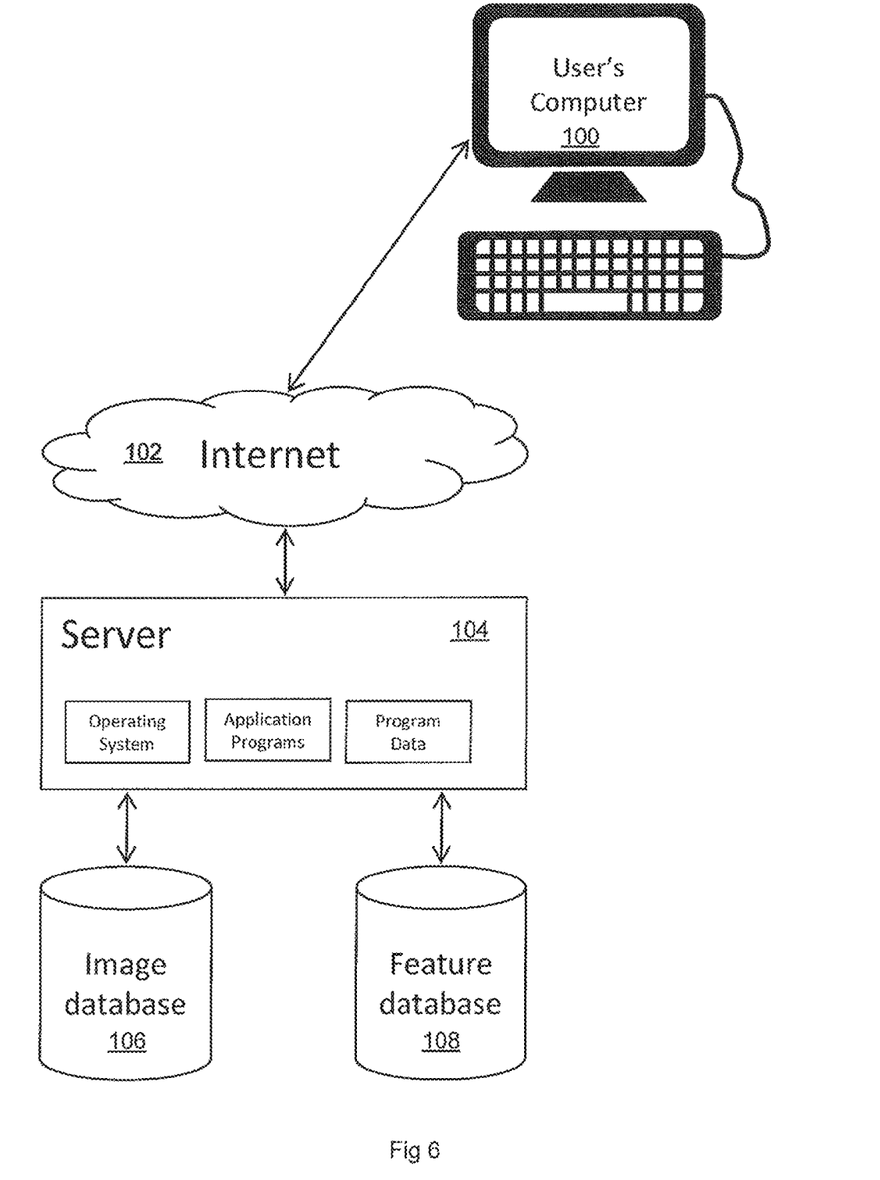
FIG. 6 schematically illustrates a system for implementing the present invention.

FIG. 6 shows a schematic image of a system which can be used to implement the various processes described herein. The system can be used in many ways, including allowing a user to make searches and categorizing images in an image database.

Where a user is inputting data, e.g. an image to be searched or categorized, a user can use an input device 100. The input device is shown as a computer but may be any suitable device, including computers, laptops, mobile phones. Each input device typically comprises one or more processors, memory, a display, a user interface, e.g. devices such as keypad, keyboard, microphone, touch screen and a network interface. The input device 100 is connected in any known manner, e.g. over the Internet 102, to a server 104 for processing any user input.

The server 104 comprises a processor or operating system which processing any data received at the server. The server 104 also comprises memory storing applications programs and program data. These application programs are run to create the desired functionality. For example, if the server 104 receives an image from a user, the server may run the application program which generates the signature for this image as described in FIGS. 2a and 2b. Once the signature has been generated, this may be used to search for comparable images as described in more detail in relation to FIG. 7e or to categorize the image for storage in a library as described in relation to FIG. 8d.

As shown in FIG. 6, the server is connected to an image database 106 and a feature database 108. The feature database 108 may store the signatures created as described above. The image database 106 may store the image associated with these signatures. When a user is selecting an image for searching, an image(s) from the image database may be presented to a user on the user interface of the input device 100 for selection. When searching for comparable images, the server may query the images and associated signatures in these databases. The image database 106 and a feature database 108 may also be termed a library as described in more detail below.

The server may be implemented using standard technology as a single unit or a plurality of interconnected units. The hardware components of any server typically include: a central processing unit (CPU), an Input/Output (I/O) Controller, a system power and clock source; display driver; RAM; ROM; and a hard disk drive. A network interface provides connection to a computer network such as Ethernet, TCP/IP or other popular protocol network interfaces. The functionality may be embodied in software residing in computer-readable media (such as the hard drive, RAM, or ROM). A typical software hierarchy for the system can include a BIOS (Basic Input Output System) which is a set of low level computer hardware instructions, usually stored in ROM, for communications between an operating system, device driver(s) and hardware. Device drivers are hardware specific code used to communicate between the operating system and hardware peripherals. Applications are software applications written typically in C/C++, Java, assembler or equivalent which implement the desired functionality, running on top of and thus dependent on the operating system for interaction with other software code and hardware. The operating system loads after BIOS initializes, and controls and runs the hardware. Examples of operating systems include Linux™, Solaris™, Unix™, OSX™ Windows XP™ and equivalents.

FIGS. 7a to 7d show the results of a search based on a query image. In each Figure, the first image is the "query" image and the following images are the ones deemed by a searching algorithm to have the most similar pattern/texture. The searching algorithm is set out in FIG. 7e as follows:

The first step S300 is to receive an image for a search query. This may be input by a user by any known method. The next step S302 is to get the histogram for the received image. If the query image has been processed using the method described above, the histogram or the corresponding pattern feature vector may be retrieved from a database. Alternatively, the histogram may be generated in real-time as part of the query.

The next step S304 is to retrieve a histogram or corresponding pattern feature vector for another image. The image and its associated histogram are selected from a database, which may have over 1,000,000 images. This database may comprise pattern feature vectors for all images in the database, pre-computed and stored.

The two histograms can now be compared using standard techniques, e.g. earth-mover distance, Euclidean distance or another vector or histogram difference metric. Such techniques typically determine the difference between the patterns contained in the two images. The difference can be converted to a similarity by inverting it (for example by subtracting it from the maximum possible difference score). A similarity value for the pair of images is thus determined S308.

The process S310 then determines whether or not there are any other images to be compared in the database. If there are other images, steps S304 and S308 are repeated. Thus, multiple similarity values are generated in which the query image is compared with other images. These similarity values can then be ranked S312 and the highest ranking images S314 may be output. In other words, a k-nearest neighbor algorithm is applied to identify the nearest neighbors to the query image, which in this case will be the images with the most similar patterns to those contained in the query image.

Figure 7A:
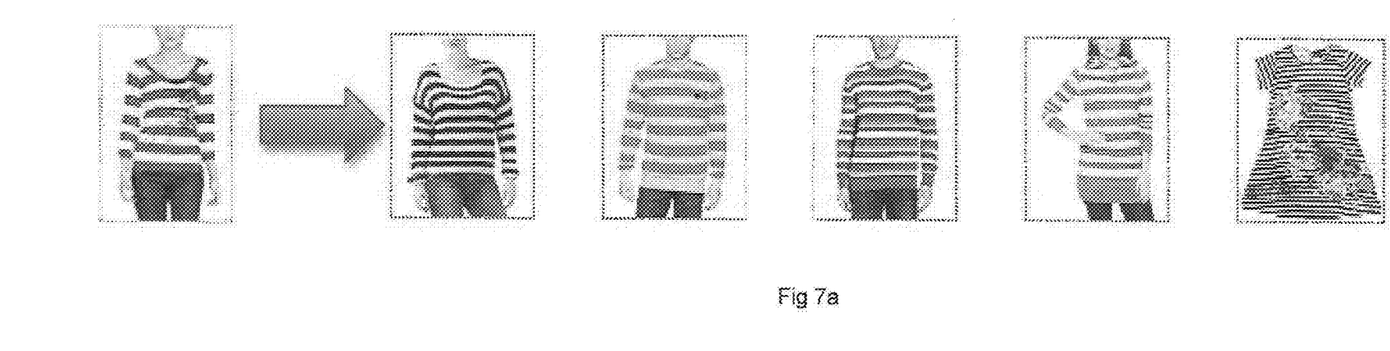
FIGS. 7a to 7d illustrate the results for searching for images which match an image which has been processed according to the present invention.

In FIG. 7a, the dominant pattern of the query image is made up, approximately, of horizontal stripes. The algorithm has correctly identified, as the five most similar images, other items of clothing with bumpy horizontal stripes. Note that color and shape have not played a part; the matching has been done solely on the patterns found in the query image.

Figure 7B:
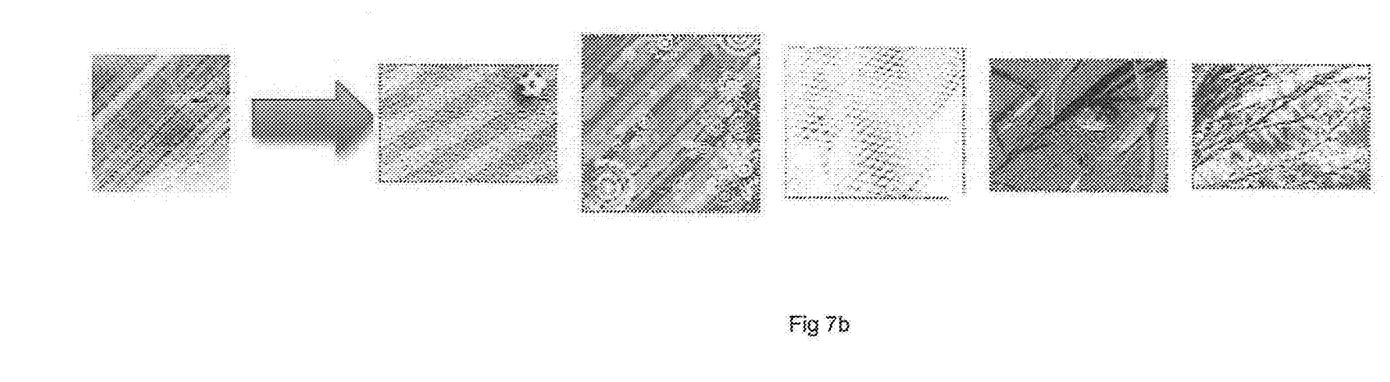

The query image in FIG. 7b is almost entirely made up of diagonal stripes. The first two results identified by the algorithm are similarly dominated by diagonal stripes. The next three results can also be seen to have diagonal patterns working from the bottom-left to the top-right, although the pattern is less visually obvious than in the query image.

Figure 7C:
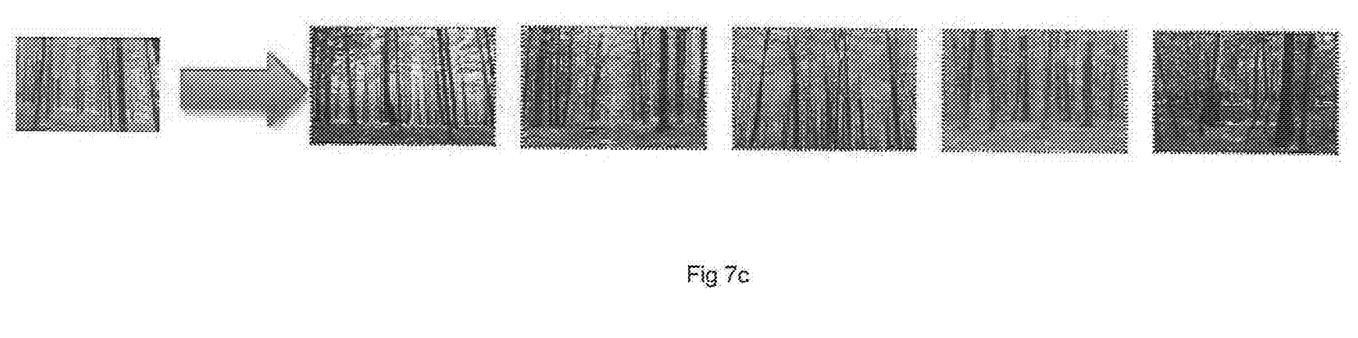

In the third query image of FIG. 7c, the pattern is made up of approximately vertical trees against a fuzzy (leafy) background. This example shows that the algorithm works well with patterns that are more complex than stripes and geometric patterns.

Figure 7D:
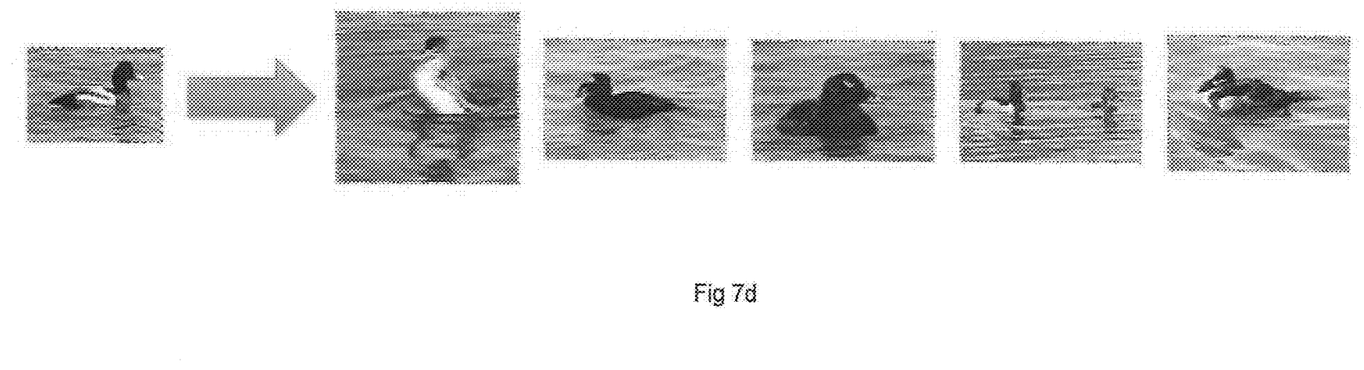
Figure 7E:
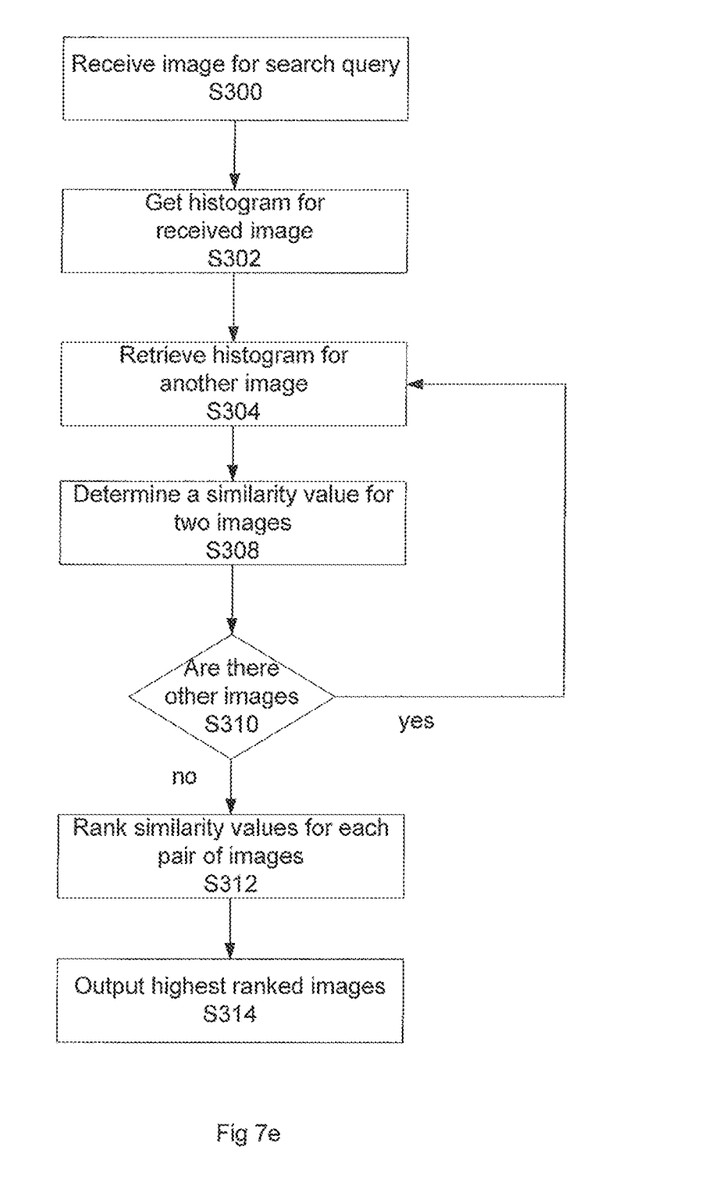
FIG. 7e is a flowchart of the method of searching used in FIGS. 7a to 7d.

In the fourth example of FIG. 7d, the pattern is more complex and less well defined. Nevertheless, the results show images having a pattern of waves created by a duck or other bird in water.

As explained above, the system comprises an image database and a feature database which stores images and their associated signatures. The searching described in relation to FIGS. 7a to 7e can be conducted through the images stored in these databases. It may be helpful for such databases to be divided into a library of patterns. For example, a library of patterns may contain some or all of the following types of pattern; vertical stripes, horizontal stripes, diagonal stripes, large dots, small dots, tiger stripes, brickwork, checks and zig-zags. Clearly other types of categories of patterns could be used as a sub-section within the library. Each sub-section has a canonical form for the pattern which is defined manually but as explained in more detail below, the library itself is built up automatically.

Such a library may be helpful when conducting a search, for example, when a user does not have an image to begin the search. In such a case, the user could select the pattern they are interested in by clicking on a sample image showing a canonical form of the pattern.

Figure 8A:
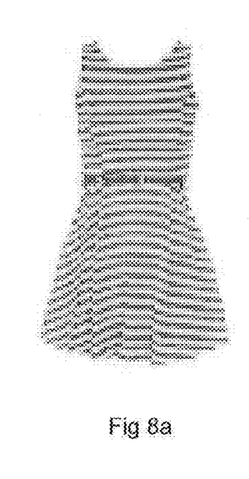
FIGS. 8a to 8c show images which are used to build up a library of images using the processing techniques of the present invention.
Figure 8B:
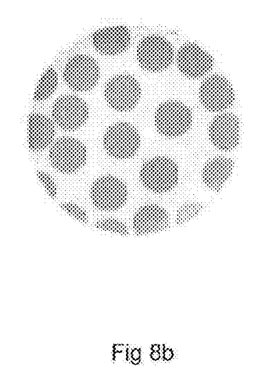
Figure 8C:
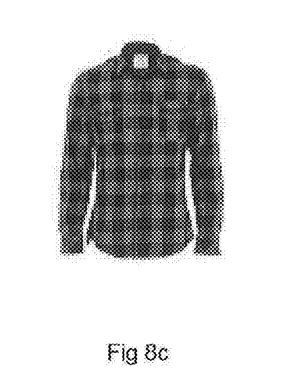
Figure 8D:
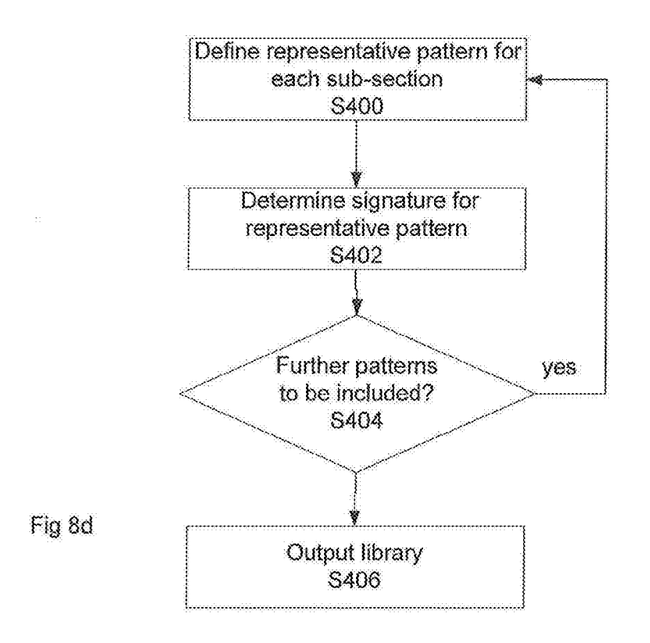
FIGS. 8d and 8e are flowcharts of the method involved in building up a library of images and categorizing images.

FIG. 8d shows how the library is initialized by defining a representative pattern (canonical form) for each sub-section at step S400. The signature for this sub-section is then determined as described above (S402). The system determines whether or not there are any further patterns to be included at step S404 and if so repeats the first two steps until the library is complete. The library is then output at step S406. For example, the images shown in FIGS. 8a to 8c may be input as the representative pattern for "stripes", "spots" and "checks" respectively. It will be appreciated that the library can be expanded by including or refining the subsections by defining new representative patterns and repeating the steps for the method.

Figure 8E:
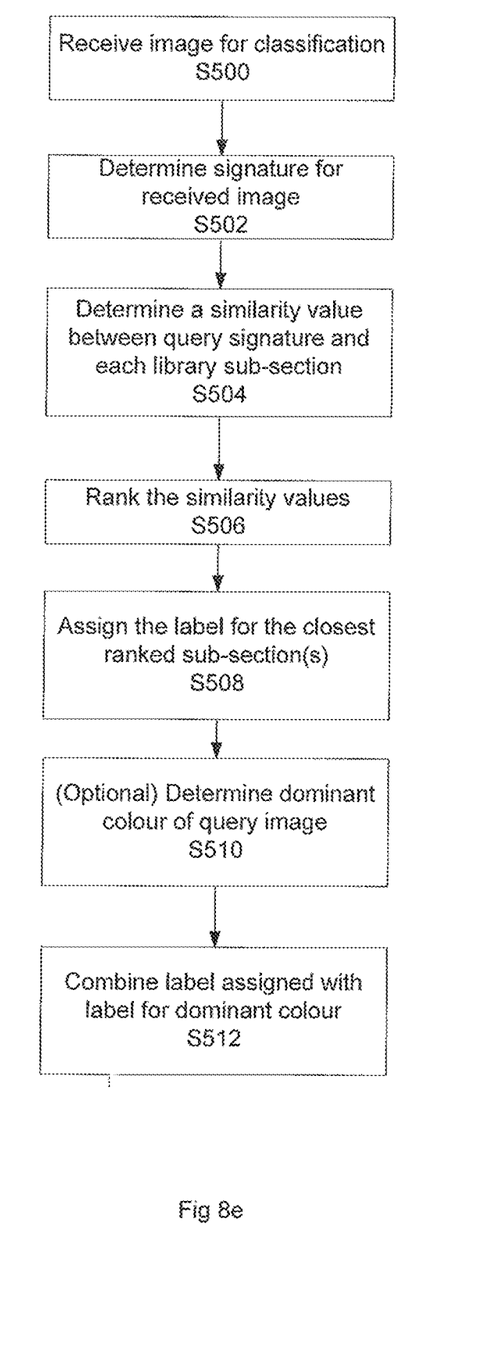

FIG. 8e shows how such a library can be used to automatically label or tag each image. For example, each image could be compared with a representative histogram for each type of pattern. Each image could then be added to the section of the library with which it has the highest similarity value or perhaps to more than one section if the similarity values are above a threshold value.

FIG. 8e shows that the algorithm to provide the functionality to tag images using a library could be as follows:

i. An image (query image) is received for classification (step S500);

ii. Compute the histogram or signature of the query image, as described above (step S502).

iii. Compare the query image's histogram with that of each dictionary pattern in turn, determining the distance (e.g. Euclidean distance) between the two histograms (step S504).

iv. The similarity values are then ranked (step S506)

v. Select the pattern whose histogram is closest to that of the query image and look up the textual description of this pattern. E.g., "Stripes". (Note that this could be in any language, making the method language independent). This label is then assigned to the ranked sub-section (step S508). It will be appreciated that more than one closest sub-image may be selected so that the image is tagged with more than one label. This is dependent on how many sub-sections are within the library.

vi. Determine either the dominant color of the image or of the elements of the pattern (step S510)

vii. Look up the textual description of the color. E.g., "Green" and Combine the color description and the pattern description to create an overall description. E.g., "Green stripes" (steps S512).

The final two steps show how the library can be optionally used to include a color tag. The histogram/signature of the image could be compared with a color histogram to determine the primary color of the image. FIGS. 8a to 8c show three examples of a canonical form for a sub-section of a library. In this case, the subsections are red horizontal stripes, green spots and purple checks.

This could be further extended with object detection to allow the system to label an image as "red striped dress" or "circular green spotted plate". Thus, the library could contain sub-sections within the sub-sections for example, horizontal stripes may be the main category, this may be sub-divided by color and may be also be sub-divided by object, e.g. horizontal striped dress or green horizontal stripes or even green horizontal striped dress.

Thus, another method for a user to input a query image is to type a query such as "Striped dress" into a text-based search engine. The canonical image of stripes may then be used as the query image. The word dress might be applied as a keyword query alongside the query image or perhaps applied against an object recognition database to identify images of dresses from within the images which match the canonical image for stripes. Alternatively, if a sub-section entitled striped dress already exists, the canonical image for this sub-section can be input as the query image to identify further images of dresses.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A non-transitory computer readable medium storing a computer program code that, when executed by one or more computers, causes the one or more computers to perform operations for processing an image to generate a signature which is characteristic of a pattern within the image, the operations comprising:
   receiving an image;
   overlaying a window at multiple locations on the image to define a plurality of sub-images within the image, with sub-image having a plurality of pixels having a luminance level;
   determining a luminance value for each sub-image, wherein said luminance value is derived from the luminance levels of the plurality of pixels in the sub-image; and
   combining the luminance values for each of the sub-images to form a signature for the image;
   wherein the combining is such that the signature is independent of the location of each sub-image.

2. The non-transitory computer readable medium of claim 1, wherein determining the luminance value of each sub-image comprises:
   determining a respective average luminance for each of the plurality of pixels in the sub-image;
   determining, for each of the pixels, whether the average luminance for the pixel is greater than a threshold value;
   assigning a first value to each pixel having an average luminance that is greater than the threshold value;
   assigning a second value to each pixel having an average luminance that is not greater than the threshold value; and
   concatenating the values assigned to each of the pixels to generate a representation of the luminance value for the sub-image.

3. The non-transitory computer readable medium of claim 2, wherein the threshold value is the average luminance value of the image.

4. The non-transitory computer readable medium of claim 2, wherein the first value is one and said second value is zero and the representation of the luminance value is a binary representation.

5. The non-transitory computer readable medium of claim 2, wherein the representation of the luminance value identifies a slot in a histogram having a plurality of slots with each slot representing a different luminance value.

6. The non-transitory computer readable medium of claim 5, the operations further comprise incrementing a value in the slot in the histogram identified by the representation of the luminance value for the sub-image.

7. The non-transitory computer readable medium of claim 6, wherein the operations further comprise converting the histogram to a feature vector to form the signature for the image.

8. The non-transitory computer readable medium of claim 6, wherein the histogram is the signature for the image.

9. The non-transitory computer readable medium of claim 5, wherein the histogram has 512 slots and each sub-image has 3×3 pixels.

10. The non-transitory computer readable medium of claim 1, wherein at least some of the plurality of sub-images partially overlap at least one other sub-image of the plurality of sub-images.

11. The non-transitory computer readable medium of claim 1, the operations further comprising rescaling the received image to a fixed size before overlaying the window.

12. The non-transitory computer readable medium of claim 11, the operations further comprising converting the received image or the rescaled image to greyscale before determining the luminance values.

13. The non-transitory computer readable medium of claim 1, the operations further comprising converting each sub-image to greyscale when determining the luminance value for the sub-image.

14. The non-transitory computer readable medium of claim 1, the operations further comprising rescaling a size of each sub-image.

15. The non-transitory computer readable medium of claim 1, the operations further comprising:
retrieving other signatures for other images from a database;
comparing the signature for the image with the other signatures for the other images to generate a respective similarity value for each other image, wherein the similarity value represents a similarity between the image and the other image; and
identifying one or more other images as similar to the image based on the similarity values.

16. A non-transitory computer readable medium storing a computer program that, when executed by one or more computers, causes the one or more computers to perform operations for creating a database of images, the operations comprising:
defining a plurality of sub-sections within the database with each sub-section having a corresponding signature, wherein the corresponding signature for each sub-section is the signature for an image representative of the sub-section;
receiving an input image to be input into the database;
determining a signature for the input image, comprising:
overlaying a window at multiple locations on the input image to define a plurality of input sub-images within the input image, with each sub-image having a plurality of pixels having a luminance level;
determining a luminance value for each sub-image, wherein the luminance value is derived from the luminance levels of the plurality of pixels in the sub-image;
combining the luminance values for each of the sub-images to form the signature for the input image;
wherein the combining is such that the signature for the input image is independent of the location of each sub-image;
comparing the signature for the input image with the signature for each of the plurality of sub-sections to generate a respective similarity value for each of the plurality of sub-sections;
ranking the similarity values; and
allocating the input image to the sub-section having the highest ranked similarity value.

17. A system comprising one or more computers and one or more storage devices storing instructions that when executed by the one or more computers cause the one or more computers to perform operations comprising:
receiving an image;
overlaying a window at multiple locations on the image to define a plurality of sub-images within the image, with each sub-image having a plurality of pixels having a luminance level;
determining a luminance value for each sub-image, wherein said luminance value is derived from the luminance levels of the plurality of pixels in the sub-image; and
combining the luminance values for each of the sub-images to form a signature for the image;
wherein the combining is such that the signature is independent of the location of each sub-image.

18. The system of claim 17, wherein determining the luminance value of each sub-image comprises:
determining a respective average luminance for each of the plurality of pixels in the sub-image;
determining, for each of the pixels, whether the average luminance for the pixel is greater than a threshold value;
assigning a first value to each pixel having an average luminance that is greater than the threshold value;
assigning a second value to each pixel having an average luminance that is not greater than the threshold value; and
concatenating the values assigned to each of the pixels to generate a representation of the luminance value for the sub-image.

19. The system of claim 18, wherein the representation of the luminance value identifies a slot in a histogram having a plurality of slots with each slot representing a different luminance value.

20. The system of claim 19, the operations further comprise incrementing a value in the slot in the histogram identified by the representation of the luminance value for the sub-image.

* * * * *